(Model.)
S. B. CUSTER & W. L. GORRELL.
PRUNING IMPLEMENT.
No. 458,560. Patented Sept. 1, 1891.
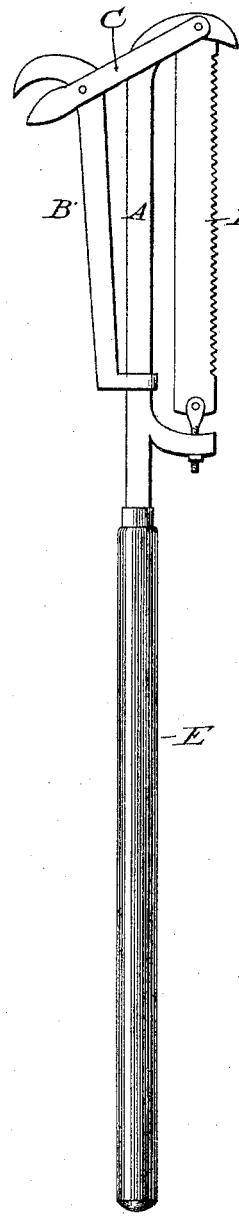
Witnesses:
R. L. Hardisty
Benj. D. Williams
Inventors:
Sylvester B. Custer
W. L. Gorrell

UNITED STATES PATENT OFFICE.

SYLVESTER B. CUSTER AND WILLIAM L. GORRELL, OF SANDY, WEST VIRGINIA.

PRUNING IMPLEMENT.

SPECIFICATION forming part of Letters Patent No. 458,560, dated September 1, 1891.

Application filed November 26, 1890. Serial No. 372,754. (Model.)

*To all whom it may concern:*

Be it known that we, SYLVESTER B. CUSTER and WILLIAM L. GORRELL, citizens of the United States, residing at Sandy, in the county of Jackson and State of West Virginia, have invented a new and useful Fruit-Tree Pruner, of which the following is a specification.

Our invention relates to improvements in fruit-tree pruners, in which the saw attachment to the shearing-knife and the knife operate together in the one implement; and the objects of our improvements are to secure the handiness in heavy pruning by the saw attachment. The shearing-knife is used for light pruning. We attain these objects by the mechanism illustrated in the accompanying drawing, in which the one figure shows the entire implement put together ready for use. The saw D is bolted on two extensions on the single shaft A, which has a wooden handle E on the lower end. The blade C is pivoted to the upper end of saw-frame and upon said blade two inches from the opposite end C is pivoted the upper end of sliding arm B, with its lower end looped around the shaft A, making a complete implement, which is used by placing the hooked sliding arm B over the limb and with a gentle or slight jerk the cutting is easily done. If the limb is too heavy to cut, use the saw.

We are aware that prior to our invention many pruning implements with saws have been made. We therefore do not claim the combination, broadly; but What we do claim as our invention, and desire to secure by Letters Patent, is—

In a pruning implement, the combination, with the handle E, of the single shaft A, having two extensions carrying a saw D, the blade C, pivoted to the upper one of said extensions, and the hooked sliding arm B, pivoted at its upper end to the blade C and at its lower end looped around the shaft A, substantially as and for the purpose described.

SYLVESTER B. CUSTER.
    WILLIAM L. GORRELL.

Witnesses:
 C. B. HOWES,
 J. S. DILWORTH.